July 28, 1959 C. J. GODWIN ET AL 2,896,314

COMPONENT ASSEMBLY SYSTEM

Filed March 21, 1955 4 Sheets-Sheet 1

INVENTORS:
CHARLES J. GODWIN,
MARK HUROWITZ,
PHILIP D. KAPLAN,
EARL W. SIEGEL,
THOMAS W. ZEBLEY,

BY

THEIR ATTORNEY.

INVENTORS:
CHARLES J. GODWIN,
MARK HUROWITZ,
PHILIP D. KAPLAN,
EARL W. SIEGEL,
THOMAS W. ZEBLEY,

BY George Pettigrath
THEIR ATTORNEY

INVENTORS:
CHARLES J. GODWIN,
MARK HUROWITZ,
PHILIP D. KAPLAN,
EARL W. SIEGEL,
THOMAS W. ZEBLEY,
BY George V. Eltgroth
THEIR ATTORNEY.

INVENTORS:
CHARLES J. GODWIN,
MARK HUROWITZ,
PHILIP D. KAPLAN,
EARL W. SIEGEL,
THOMAS W. ZEBLEY,
BY George V. Eltgroth
THEIR ATTORNEY.

United States Patent Office 2,896,314
Patented July 28, 1959

2,896,314

COMPONENT ASSEMBLY SYSTEM

Charles J. Godwin, Mark Hurowitz, Philip D. Kaplan, and Earl W. Siegel, Ithaca, and Thomas W. Zebley, Schenectady, N.Y., assignors to General Electric Company, a corporation of New York Application March 21, 1955, Serial No. 495,682
9 Claims. (Cl. 29—203)

Figure 1:
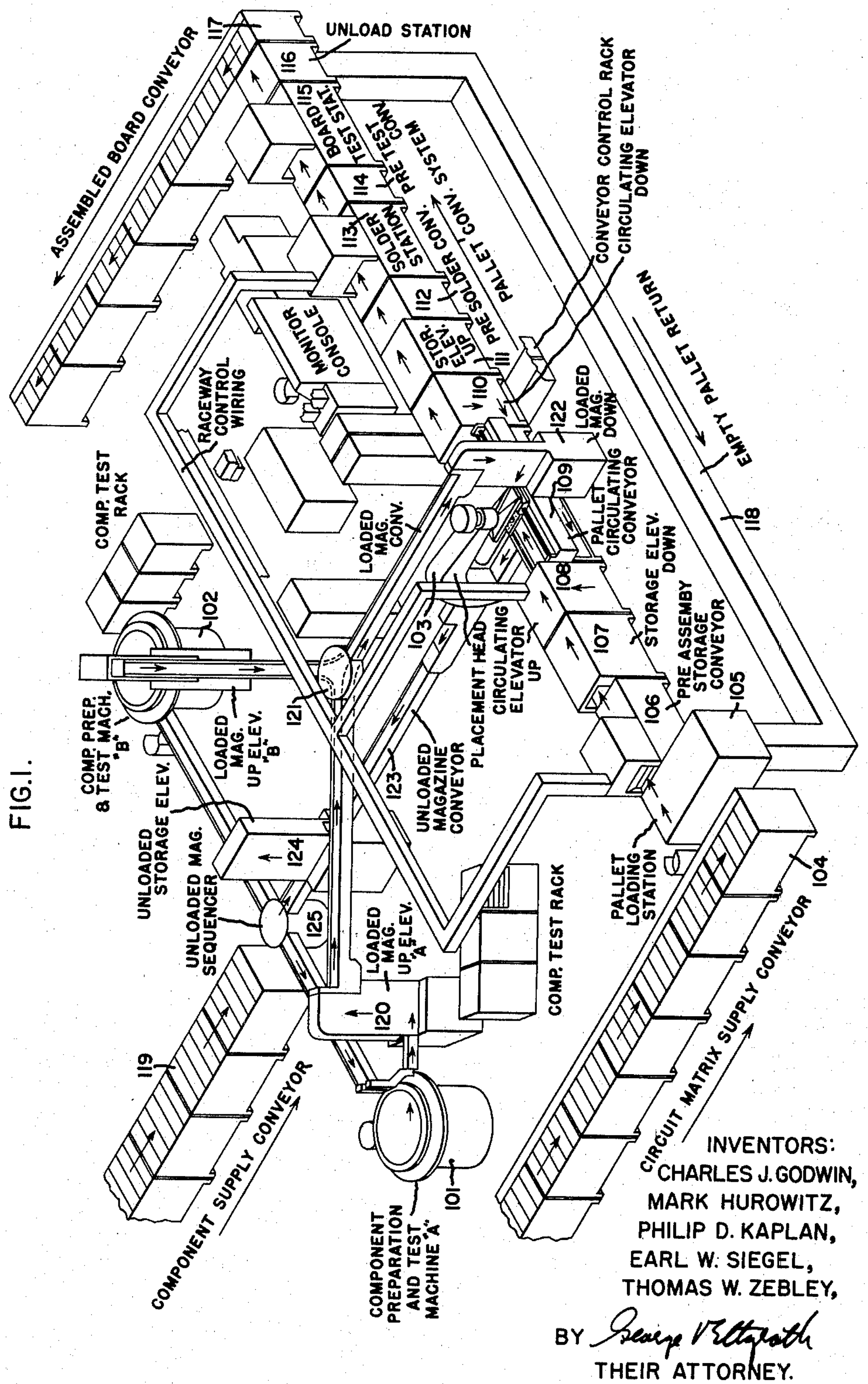

The present invention relates to systems for the assembly of leaded electrical components into circuit matrices, and deals particularly with a system in which assembly is facilitated by the use of unique conveyancing methods and apparatus.

The problem of mechanizing the assembly of leaded electrical components into circuit matrices has not previously been satisfactorily solved. Several forward steps have been taken in the mechanization of assembly such as the designing of mounts into which leaded components may be inserted by a unidirectional thrusting motion; the step of mechanically preparing the leads of components for insertion into such prepared mounts; and in the final step of soldering the components into place in circuit matrices, once they have been placed. However, the actual step of picking up the component and placing it into the desired circuit connector has resisted mechanization and it is still generally performed manually. The same is also true of the testing operation of the component, where such tests are performed.

The solutions proposed for the actual placement operation have generally been unsatisfactory for their lack of flexibility. This inflexibility results from the fact that leaded electrical components are or diverse sizes and shapes and that either different placement mechanisms must be used for each type of component or else substantial changes must be made in the placement mechanism whenever a different type of component is used. In many cases, common types of components cannot yet be placed by devices now known. When it is desired to change a single component in the assembly of an electrical circuit in such devices, it is necessary that time consuming changes be made in the machine which places this component. When several components are changed, the alterations are multiplied. This lack of flexibility thus prevents effective utilization of the stapling devices now known, and prohibits the use of such devices in low quantity production.

Satisfactory mechanization of the placement operation requires that there be considerable flexibility on the part of the apparatus handling the component, coupled with considerable accuracy in the positioning of the component leads. The handling operation must be capable of accepting many kinds of electrical components, since they may commonly be cylindrical, rectangular or flat disc-like in shape and may come in sizes ranging from less than one-half of an inch in length to lengths extending two inches. The component handling should indeed be universal. The requirements for handling of the leads themselves are extremely stringent since the connecting apertures adapted to receive the leads are often little larger than the lead diameters. An object of the present invention is to provide an assembly system which meets these requirements.

It is an additional object of the present invention to provide an improved system for the assembly of leaded electrical components into circuit matrices.

It is still another object of the present invention to provide a novel system for the assembly of leaded electrical components into circuit matrices which is readily adapted to reconversion from the assembly of one type of electrical circuit to another type of electrical circuit.

It is a further object of the present invention to provide an improved system for the assembly of leaded electrical components into circuit matrices which is readily adapted to permit substitution within the system of one type of component for another.

It is another object of the present invention to provide an improved system for the assembly of leaded electrical components into circuit matrices which is readily adapted to production of wired electrical circuits of many kinds.

These and other objects are achieved in accordance with the present invention in a novel assembly system which employs a universal component carrier at the placement machine. This universal component carrier, intermediately receives and holds a component until it is ready for placement and lends itself to convenient and precise performance of the placement operation. Further advantages are also achieved by using this universal component carrier in other stages of the assembly process, such as component testing prior to assembly. A suitable universal component carrier is that described in Patent No. 2,815,869, issued December 10, 1957, on behalf of F. M. Rives et al. and assigned to the assignee of the present invention.

By the use of such a universal component carrier, a placement machine once adapted to accept the component carrier may be readily served with many kinds of electrical components without extensive alteration. This permits a considerable reduction in the number of placement machines required to perform the assembly of a given electrical circuit, simplifying the apparatus required for the assembly of components into such a circuit. This permits the use of a single placement machine which may accommodate many kinds of components and which may place components in a plurality of positions, instead of requiring as in known systems, a large number of placement machines each adapted to perform a single placement operation of a single kind of component.

In order to improve the operation of such a machine in applicants' assembly system additional handling methods and apparatus are herein disclosed. In accordance with a further aspect of the applicants' invention, the circuit matrices into which a plurality of different components are to be assembled, are supplied in batches to the placement machine and recirculated about the placement machine, once for each kind of component.

In accordance with another aspect of the present invention, a simplified manner of supplying components to the placement machine is proposed wherein like components are supplied in a magazine which contains a number of components equal in number to the batch number of circuit matrices recirculated about the placement machine. By use of such a magazine, loading of the placement machine is required only once with the recirculation of each batch of circuit matrices about the placement machine.

Figure 2:
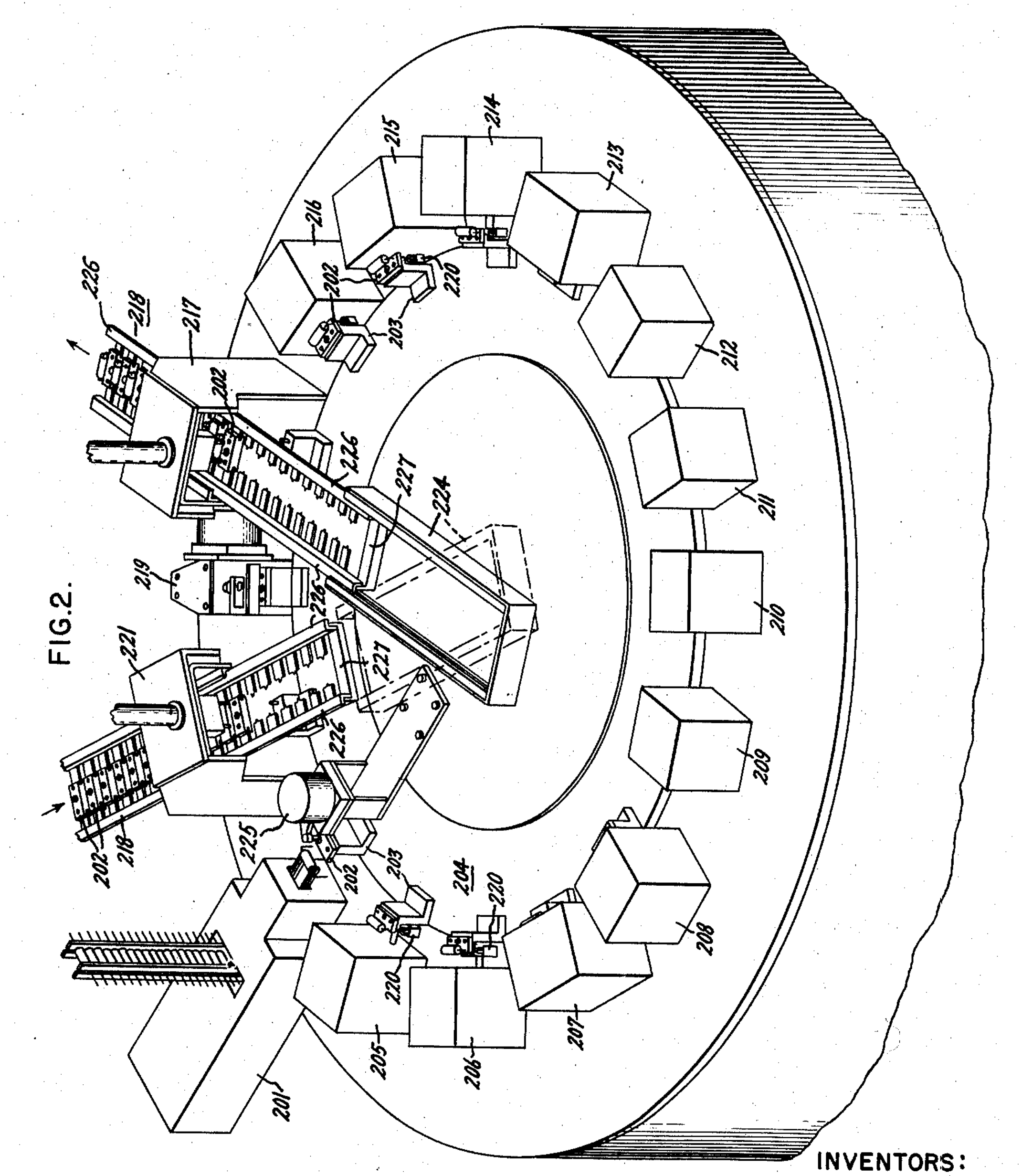
Figure 3:
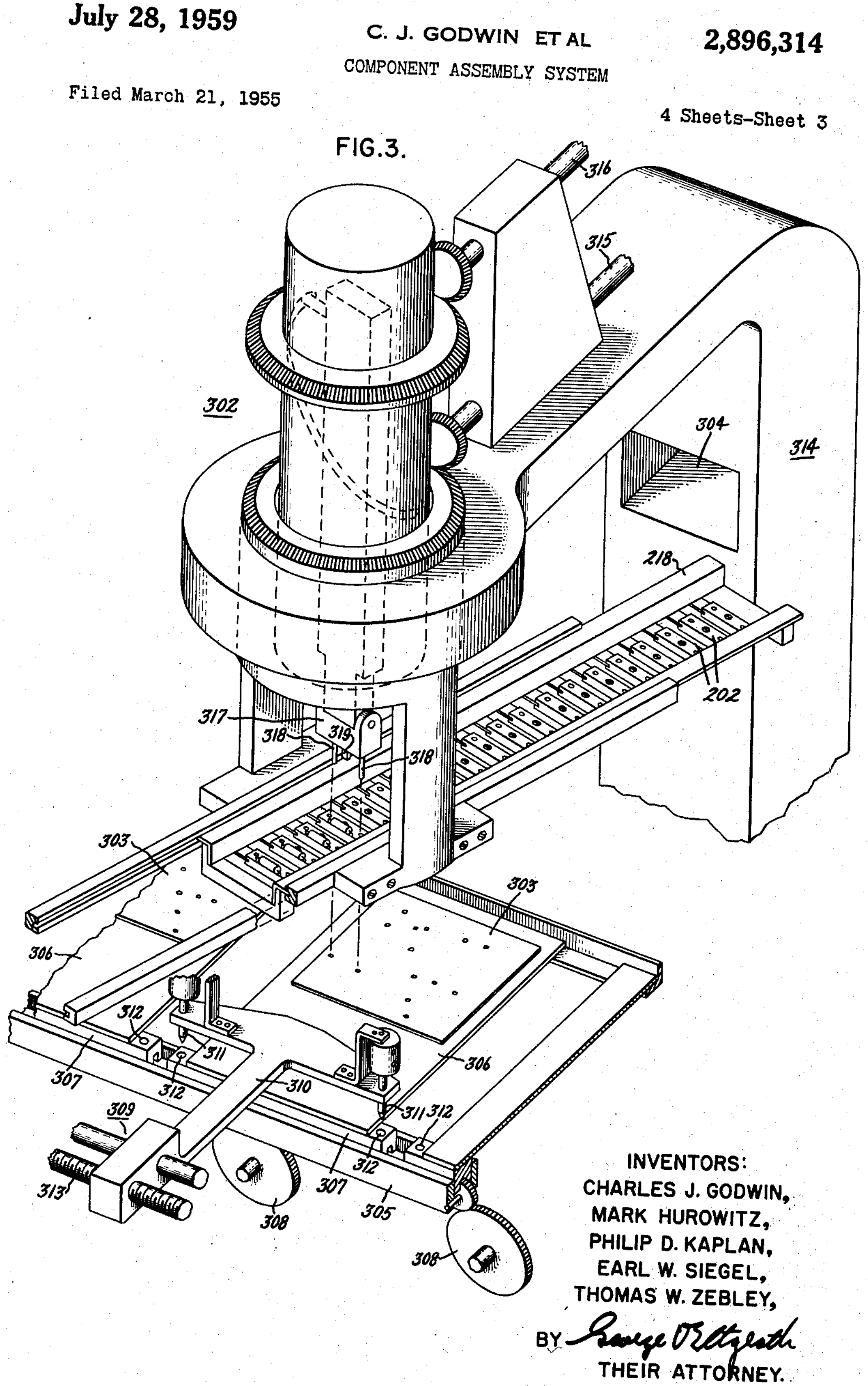
Figure 4:
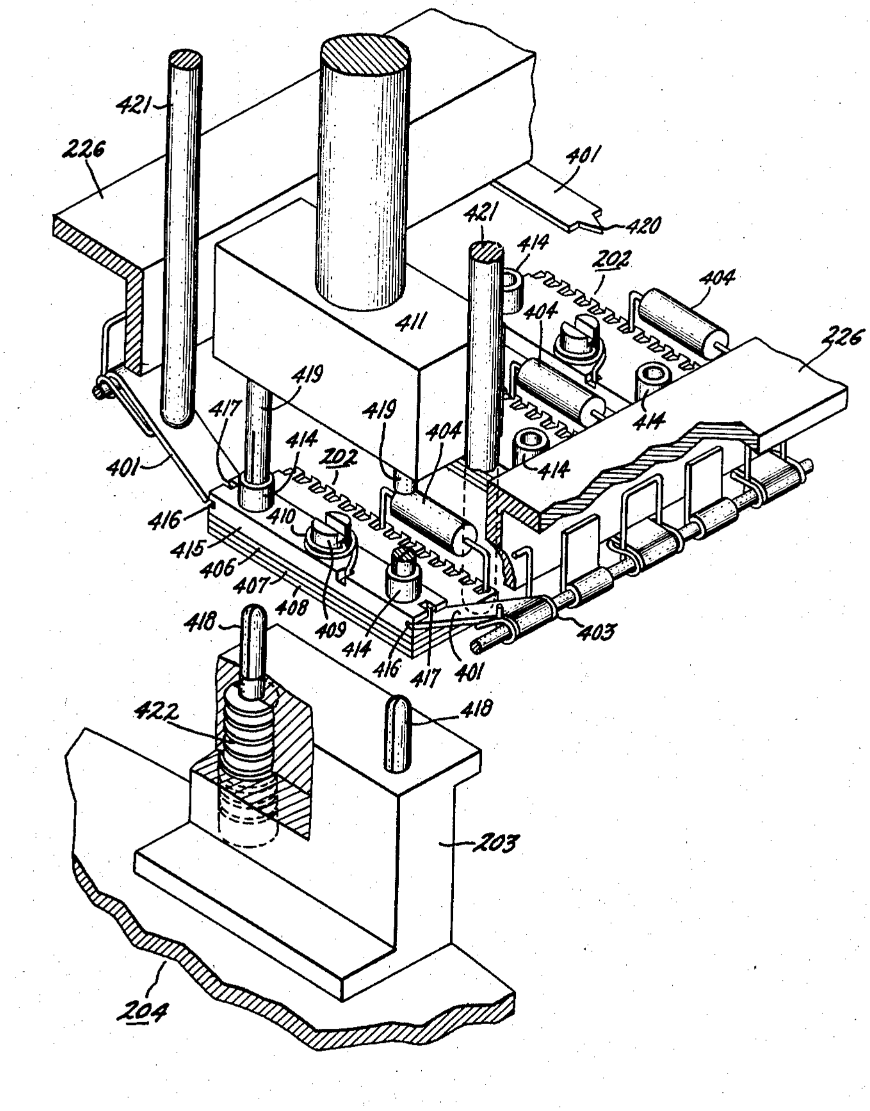

Further aspects of the present invention, and a more thoroughly understanding thereof, may be had by a consideration of certain embodiments of the present invention, which are described in the following specification and illustrated in the following drawings, wherein:

Figure 1 is a representation of a component assembly system in accordance with the present invention, Figure 2 is a drawing illustrating in detail the portion of the assembly system in which leaded electrical components enter the assembly system and are tested and fitted into conveyancing devices prior to transfer to the placement station, Figure 3 is a detailed drawing illustrating the operation of the placement machine within such an assembly system and Figure 4 is a drawing illustrating the manner in which the component is transferred from one apparatus to another.

The present invention provides means for converting sorted circuit components and circuit matrices into completely assembled electrical circuits. One input station of the assembly apparatus accordingly accepts components which are to be inserted into the circuit matrices, while another input station accepts the circuit matrices into which the circuit components are to be connected. The completely wired circuit matrices are delivered at the output of the machine.

In understanding the operation of this assembly system, it is helpful to consider this system in several separate aspects. One may first consider it with respect to the flow of materials throughout the system. This aspect of the system, for purposes of simplicity, may also be further subdivided into the flow of the materials per se and the closed loop flow of the conveyancing devices by which the materials are conveyed. The system may be further considered with respect to the supervisory electrical control of the various apparatus of the assembly system. This aspect of the system has not been discussed, however, since it is not a part of the present invention. Further subdivision may be made into portions of the material flow system, and finally consideration may be directed to specific apparatus and devices for performing specific functions within the system.

The present invention is concerned with the flow of materials throughout the system and deals particularly with the use of handling methods and apparatus facilitating such flow.

Considering now the assembly system in greater detail, one may refer to Figure 1 which illustrates the principal components of the system with arrows indicative of the flow of materials and material carriers through the system. The principal sections of the system are the apparatus which prepare the component for insertion into circuit matrices and the component placement apparatus making the actual placement of the component into the circuit matrix. In Figure 1 the component preparation occurs at the preparation stations 101 and 102. The component placement apparatus is shown at 103. The remaining apparatus illustrated in Figure 1 serves generally to provide a smooth flow of materials from the component preparation stations 101 and 102 to the component placement apparatus shown at 103, or, to provide supervisory control of the operation of the over all system. At 104 there is shown the circuit matrix supply conveyor which brings circuit matrices to one of the inputs of the system. When the circuit matrices have been delivered to the end of the supply conveyor 104 they are transferred manually to the pallet loading station 105. At the pallet loading station, the circuit matrices are inserted into pallets which support and facilitate positioning of the circuit matrices in the placement operation. The pallets, themselves, which are not a part of the present invention, will be subsequently described in greater detail in connection with the placement operation. After insertion of the circuit matrices into the pallets, the assemblies of pallet and circuit matrix are then loaded into a preassembly storage conveyor 106 which leads them next to a down storage elevator 107, and thence to a circulating up elevator 108. The circuit matrix and pallet assemblies are then circulated through a loop including the circulating up elevator 108, a circulating horizontal conveyor 109, which has an upper and lower path, and a circulating down elevator 110. The circulation within this loop will subsequently be discussed in greater detail. The circuit matrix still mounted in the pallet is then conveyed successively past the placement station, through an up storage elevator 111, a presoldering station conveyor 112 and a soldering station 113. At the soldering station, the components which have been placed at the placement head 103 are soldered into position. Subsequently, the wired circuit matrices are transferred to a pre-test conveyor 114 and circuit matrix test station 115. At the station 115 the wiring is checked electrically. At an unloading station 116, which receives the matrix after testing, the circuit matrix is stripped from the pallet and loaded upon the assembled circuit matrix conveyor 117. At the same time, the now empty pallets are loaded into an empty pallet return conveyor 118 which returns them to the pallet loading station.

The path which is followed by the circuit matrix from the input of the system at the supply conveyor 104 is in this manner completed to the output of the system at the assembled circuit matrix conveyor 117. The path of the circuit matrix through the system coincides with the path of the pallets, over a portion of the closed loop through which the pallets circulate.

The leading electrical components also follow a regular path through the system aided by two handling devices which circulate in closed loops. The components are brought to the system by the component supply conveyor 119. They are preferably delivered in groups mounted on cardboard holders or the like. They are next manually transferred to the component preparation stations 101 or 102. Here they are loaded into a component lead preparation apparatus 201, best seen in Figure 2. The component lead preparation apparatus 201 straightens the leads of the component and then bends them to extend at right angles to the axis of the component, and optionally clips them to length. They are then discharged from the lead preparation machine 201, being thrust into an awaiting component carrier 202, which is supported by means of a stand 203 upon the rotating turret platform 204. The carrier 202 is opened to receive the component by means of a tongue and slot actuator 225, which is brought down into driving position at each index of the turret 204. During the time that the turret is stationary, driver 225 opens the component carrier for reception of a component from the lead preparing machine 201. Once placed in the carriers, the components remain in the carriers as the turret platform 204 continues to index past each successive preparation or testing stations 205 through 216. The stations 205 through 216 perform additional component lead preparation steps and electrical tests upon the components. When the turret has indexed the components in component carriers through the test stations, it indexes next to the magazine loading station 217. At the loading station 217, the loaded component carriers containing components which have passed the tests are loaded into magazines 218 adapted to accommodate a number of the component carriers. The carriers containing rejected components move past the loading station 217 and are cleared of components at 219. The empty carrier is then returned to the preparation machine 201 for new components.

Fully mechanized testing of the components is accomplished at the component preparation and test machines 101 and 102. It is greatly facilitated by the fact that the leads of the electrical components are now of uniform shape and that they are securely and accurately positioned in the component carrier. In the test process, good electrical contact with the leads of the component is necessary. A suitable type of contacting mechanism, not a part of the present invention, is shown at 220 mounted upon the stationary portion of the test station. It comprises opposed pairs of spring fingers adapted to open during indexing and to close when the turret stops. These spring fingers make contact on the lead wires near the point of their support by the component carrier. In order that the proper leads be contacted during test, it is necessary that the lead position be carefully controlled. This requires precise indexing on the part of the rotating turret 204, accurate positioning of the stand 203 on the turret 204, and accurate positioning of the component leads within the component carrier.

Returning now to Figure 1, we may continue to follow the course of the component and its carrier through the system. When the component is discharged from the component preparation machine 101 or 102 it is supported within a component carrier, which is carried in batches of twenty by a magazine. The magazine carries twenty like components in their carriers. A conveyor transports the loaded magazine to an up elevator 120 and thence through a conveyor to a sequencing apparatus 121. The magazine next leaves the sequencer, passing on to the loaded magazine down elevator 122 placed in proximity to the placement head 103.

At the component placement station 103, the loaded magazines, shown best at 218 in Figure 3, are loaded on the component placement head 302. The component placement head 302, carrying the magazine 218, then places components in a cricuit matrix or board 303 arranged below, disengages the component from the component carrier, thus leaving the component in place in the circuit matrix and returning the empty component carrier to a place in the magazine. This motion of the head is followed by an indexing motion of the magazine 218, placing the next loaded carrier into position beneath the placement head, and translation of another circuit matrix to the position formerly occupied by the one in which the previous component was placed. The placement sequence is repeated until all of the component carriers on the magazine have been emptied and returned empty to the magazine. Then the component placement head is rotated into position to permit the magazine to be indexed into the unloaded magazine conveyor 304 which speeds the component magazine on its way back to the component placement machines 101 or 102.

Having left the placement station in unloaded condition the component magazines are returned to an unloaded magazine storage elevator 124 and thence to the unloaded magazine sequencer 125. At the unloaded magazine sequencer 125 the magazines are switched, to either the component preparation machine 101 or the component preparation machine 102.

The handling of the unloaded component magazine and its reloading at the component machine preparation may be understood from a consideration of Figure 2. The magazine from the unloaded magazine sequencer 125 is placed in a conveyor which delivers the magazine, now containing unloaded component carriers, to the magazine unloading station 221. Here component carriers are stripped from the magazine and loaded onto the carrier supporting stands 203 supported on the rotating turret 204. As the component carriers continue to be discharged from the magazine, the magazine continues to index toward the center of the preparation station. The magazine transfer switch 224 is placed at the center. This switch is adapted to engage the end of the magazine when a specified number of component carriers have been discharged from the magazine. Prior to picking up a new magazine, however, the magazine transfer switch discharges the magazine it previously had to the magazine loading station 217. The magazine discharged to the loading station 217 is then fully loaded with leaded component carriers and sent through conveyors to the placement machine.

The testing operation may be automatically controlled and is done in magazine loads or "batches" of like valued components. This mode of testing considerably reduces the information rate at the preparation and test stations, and leads to important advantages in the later placement process since each magazine only contains one kind of component. Loading is simplified, since it is standardized practice to ship components in groups of the same values.

The test operation is usually somewhat slower than the placement operation. Hence it is usually preferable that two preparation machines be employed with a single placement machine with appropriate means for selecting their output as each has finished. The magazine sequencer 121 is a device which further smooths the delivery of loaded magazines to the placement machine, being controlled to permit one machine to deliver two loaded magazines while the other is delivering a single one should the other testing operation take twice as long as the first.

The discussion has now outlined the course of the circuit matrix and its associated handling device, the pallet, through the system, and the course of the component and its handling devices; the magazine and the component carrier, through the system. In order to more clearly understand the manner in which handling of the component is facilitated by the magazine and the component carriers, the construction of these conveyancing devices should be explained. These devices are not in themselves a part of the present invention. The component carrier, per se, is the subject of Patent No. 2,815,869, issued December 10, 1957, on behalf of F. M. Rives et al. and assigned to the assignee of the present invention.

The magazine is shown in Figures 2, 3 and 4. The overall construction of the magazine will be described in connection with Figure 2 while the detailed construction of the magazine will be made with respect to the partial showing of the magazine made in Figure 4. Most reference numerals lying within 200 series are intended to be read in connection with Figure 2 whereas most reference numerals in the 400 series indicate that the description particularly refers to the showing made in Figure 4. The magazine consists of a frame made of angles 226 and cross braces 227; and a plurality of component carrier gripping fingers The component carrier gripping fingers, better seen in Figure 4, are shown at 401. They are arranged in pairs upon the angles partially shown at 226, and extend inwardly to a distance which permits them to support a component carrier between them. The fingers 401 are arranged to pivot about an axis parallel to the longitudinal axis of angles 226, and the fingers are biased by a spring means 403 which tends to urge the fingers into a generally horizontal position against a stop mechanism. The stop mechanism thus prevents the fingers 401 from rising above the horizontal position under the influence of the upward bias of the biasing springs.

Further details in the construction of the component carrier and the manner in which it is manipulated in both the preparation and placement stations may be understood by reference to Figure 4. Figure 4 illustrates the manner in which a component is carried by the component carrier and the manner in which the component carrier facilitates the transfer of a component from a supporting stand at the component preparation and test station to the magazine. In general, the same elements are involved when the component is discharged from the magazine. It is thought that consideration of this Figure 4 will lead to a clearer understanding of both the handling of the component at the preparation station and at the component placement station.

The component is supported in the component carrier by the leads. An axial leaded component 404, which may be a small carbon resistor or a tubular capacitor, is shown in place in a component carrier 202. The leads of the component 404 are shown extending through three adjacent teethed members 406, 407 and 408. These members form the jaws of the component carrier 202. By gripping the leads of the component, they provide support for the component and accurately position the component leads. The outer teethed members 406 and 408 may be displaced laterally with respect to the inner teethed member 407 by means of a cam operating actuator member 409 in order to open the jaws of the component carrier and permit loading or unloading of the carrier. A spring 410, shown encircling the actuator member 409, exerts a biasing force which tends to keep the jaws in closed position, thus tightly gripping the leads of a component held therein.

The component carrier 202 is shown in the process of transferring a component from the turret for preparing the components to a magazine for subsequent transfer to the component placement apparatus. In Figure 4, the component 404, in its carrier 202, has just been lifted by the magazine loading head 411 upward from the component supporting stand 203. The component carrier 202 is in initial engagement with the supporting fingers 401 of the component carrier magazine. The component carrier supporting stand 203 is one of a group of supporting stands which are mounted upon the rotating turret 204 and periodically indexed into position under the magazine loading head 411 for the delivery of components to the loading head. The component magazine, into which the component carriers are being loaded may be transferred to a component placement apparatus after it is fully loaded.

Handling of the component carrier in gross is provided by two transfer portions of the component carrier: Hollow angle collets 414 attached to the frame member 415 and the slots 416 and 417 at the ends of the frame member 415. The collets 414 are utilized in handling the component carrier at the supporting stand 203 and at the magazine loading head 411. Both the supporting stand and the magazine loading head are provided with cylindrical studs which enter the collets 414 of the component carrier. The studs of both the supporting stand and the loading head may be of split construction, having sectors formed with a slight outward bias in order to provide a firm grip on the inner surfaces of the collets 414 of the component carrier. The studs 418 of the supporting stand 203 are further adapted to recess in an axial or downward direction under the influence of a downward pressure. Biasing means 422 concealed in the stand 203 tend, however, to keep the studs upwardly extended. The pins 419 on the loading head 411 are arranged to depress the studs 418 of the supporting stand for transferring the component from the supporting stand to the loading head.

The slots 416 and 417 provide the means by which the component carrier 415 is supported in the component carrier magazine. The slots 416 are in a horizontal plane, while the slots 417, which are of greater depth than the slots 416, are in a vertical plane. The flat fingers 401 of the magazine extend inwardly from the sides of the magazine and grip the carrier. When the fingers 401 are in horizontal position, they are adapted to support a component carrier by the slots 415 at either end of the carrier, the fingers being spaced apart a distance just slightly larger than the distance separating the bottom surfaces of the slots 416. In order to center the component carrier in the fingers 401, the fingers are each provided with a triangular point 420 which enters the vertical slot 417. Loading and unloading of the carrier from the magazine is achieved by increasing the separation between the inner edges of the fingers 401 to a distance greater than the width of the component carrier. This may be accomplished by depressing the fingers and rotating the tips away from one another. The magazine loading head 411 is provided with a pair of finger depressing plungers 421 which serve to open and close the carrier gripping fingers 401.

Transfer of the component carrier from the turret 413 to the magazine occurs in the following manner: A supporting stand 203 bearing a component carrier on its retractable studs 418 is indexed into position beneath the loading head 411. The loading head 411 moves downward, and its pins 419 enter the collets 414 of the component carrier, forcing the studs 418 of the stand into retracted position, thus freeing the carrier from the stand 203 and transferring it to the loading head 411. The loading head then commences to rise with the carrier. Prior to the time that the carrier has been elevated to the level of the magazine fingers 401, the finger depressing plunger 421 has spread the fingers 401 to the distance necessary to permit the component carrier to enter between the fingers. The fingers 401 are then nested within the slots 416 to grip the component carrier 202. As the loading head 411 continues its upward course, the fingers reach horizontal position, beyond which they cannot go. At this point, they strip the component carrier from the loading head, leaving it in place in the magazine.

The component handling requirements of the placement operation may best be understood by consideration of the placement head. The placement head is shown in Figure 3 and bears the reference numeral 302. It is associated with a horizontal conveyor 305 which conveys circuit matrices 303 beneath the head. The conveyor 305 is also shown in Figure 1, where it forms a part of the circulating conveyor bearing the reference numeral 109.

Positioning of the circuit matrix 303 is accomplished by two means. Inaccuracies in handling of the circuit board itself are minimized by fixing the circuit board 303 to a pallet 306. The pallet, while not illustrated in detail, is adjustable to a number of sizes of circuit matrices, an adjustable frame (not shown) permitting this. The pallet guide bar 307 is adapted to bear upon the surface of the conveyor 305. The guide bar 307 has a concealed rack on its undersurface which engages driving wheels 308 to cause translation of the assembly along the horizontal conveyor 305. Precise location of the pallet 306 with respect to the placement head 302 is provided by the pallet placement mechanism 309. This mechanism comprises a T-shaped member 310 having a solenoid-operated taper pin 311 at both ends of the cross bar. The taper pin 311 is adapted to be forced into a pair of holes 312 in the pallet guide bar. Precise positioning of the T member is provided by a worm drive shown symbolically at 313. The pallet locating mechanism precisely locates the pallet longitudinally along the conveyor with respect to the placement head. It provides sufficient accuracy in circuit matrix positioning to permit the placement of component leads into pre-punched holes in the pallet 303.

While the conveyor 305 and the pallet driving mechanism 308 provide translation longitudinally along the conveyor, translation and rotation of the placement head with respect to the conveyor provide the other two degrees of freedom of component positioning. The means for providing transverse positioning, which have not been shown, may include a worm drive which translates the C frame 314 of the placement machine as a unit transversely with respect to the conveyor 305. Angular rotation of the placement head is provided by the rotating shaft 315 which operates a beveled ring gear upon the support for the placement foot 317 of the placement head. The shaft 316, which is connected to suitable driving means, operates a cam by which the placement foot 317 is caused to rise and fall in the placement operation. The foot 317 is provided with lugs 318 for picking off the component carriers, and a driver actuator 319 for opening the component carrier. The placement mechanism is not in itself a part of the present invention and is claimed in Patent No. 2,829,371, issued April 8, 1958, on behalf of G. H. Sittner, et al., and assigned to the assignee of the present invention.

The flow of materials during the placement operation at the placement head may now be described. When a batch of circuit boards has been completed, the conveyor loop about the placement head is opened. Pallets loaded with circuit matrices are admitted from the storage down elevator 107 to the circulating up elevator 108. At the same time, the previous batch of circuit matrices upon which components have been placed is discharged from the circulating down elevator 110 to the storage up elevator 111. The fresh pallets are then introduced from the circulating up elevator 108 to the pallet circulating conveyor 109 which carries the circuit board in the pallet by means of the driver mechanism 308 to approximately the correct position beneath the placement head. The precise pallet placement mechanism 309 is then energized and the solenoid-operated pins 311 are forced down into the pallet guide bar holes 312, thus accurately locating the circuit matrix along the longitudinal axis of the conveyor. The pallet is momentarily held in place while the placement head brings components down into position.

A new group of components is brought to the placement head at approximately the same time that the new batch of pallets are admitted to the system. The magazine in which they are carried is admitted to the placement machine from the loaded magazine down conveyor 122 at about the same time that the unloaded magazine is delivered to the unloaded magazine conveyor 123. In order to effect the loading operation, the C frame is brought to loading position and the placement head is rotated in line with the two conveyors 122 and 123. After the exchange of an unloaded magazine for a new loaded magazine, the magazine is rotated to the position desired for placing the type of component contained in the new magazine. At that time the magazine is held with the component at one end immediately beneath the placement foot 317. The placement head descends, as explained previously, and the pins 318 of the placement foot engage the collets of the component carrier forcing the component carrier down out of the magazine. The placement head continues in a downward path until the leads of the component, extending through the component carrier have entered the holes punched in the pallet for reception of the leads. Then, the actuator driver 319 is rotated to open the jaws of the component carrier and release the components. The foot 317 is then rotated away from the component by rocking around its pivotal mount so as to prevent displacement of the component by the empty carrier, and the foot is raised up through the component magazine. Actuating means, similar to the members 421 shown in Figure 4, for operating the fingers 401 of the magazine are synchronized with the movement of the placement foot so as to facilitate retrieval of the empty carrier by the carrier gripping fingers of the magazine. As the component placement cycle is thus completed, the magazine is advanced to place a new carrier under the placement head by means, not shown, at the same time the solenoid retaining the pallet in place causes the pin 311 to be raised, and the pallet into which the component has just been inserted is advanced longitudinally along the conveyor, to be replaced by a similar circuit matrix carrier in a similar pallet. The process of circulating a batch of pallets under the placement head is continued until all of the carriers in the magazine have been unloaded, and each of the circuit matrices has correspondingly received a component.

After the magazine is cleared, then a new magazine containing a new batch of components is introduced to the placement head, and the circuit matrices are again recirculated under the placement head. The re-circulation of the pallets under the placement head with attendant change in magazine continues until each of the pallets has received all kinds of components. Then the entrance to the circulating up elevator 108 is opened and the exit from the circulating down elevator 110 is opened and a new batch of pallets is admitted to the circulating system while the prior batch is sent on to the storage up elevator 111 for eventual soldering and test.

The method of supporting a magazine of like components upon the placement head and indexing the machine upon the head as each component is placed has many advantages over repositioning the head assembly after each component is placed. Using indexing of the magazine and like components within the magazine makes it possible to hold the relatively massive head still during the placement of a batch, i.e., magazine load of components upon a like numbered batch of circulating circuit boards.

The number of components in a magazine is intimately linked to the timing of the apparatus controlling the supply of circuit matrices to the placement head. Since it is desired to use the component placement head for the positioning of a large number of different kinds of electrical components on a circuit board, it is preferable that it position relatively small numbered batches. Separation of the circuit boards into like numbered batches is achieved at the entrance to the circulating up elevator 108 and at the exit of the circulating down elevator 110. These points are periodically opened to permit replacement of the completed batch of boards by a new batch. The storage down elevator 107 permits collection of the circuit board-loaded pallets at the entrance of the circulating up elevator 108, and minimizes time delays at the pallet loading station. The storage up elevator 111 performs a complementary function at the output of the placement head, accumulating a batch of the wired circuit boards after their rapid discharge from the placement loop, but releasing them to the subsequent solder station 113 and test stations 115 at a rate more in accord with the capacities of these portions of the apparatus. The smoothing function of the storage devices as related to the working rate at the pallet loading station 105 and at the solder station 113 and test station 115 prevent the number of the batch from being too large.

The logical organization and functional interrelationship of the various portions of the apparatus comprising the system have been treated in considerable detail. Mechanical movements and linkages for driving the cooperating parts of the system through their work cycle may be selected or derived from any convenient source, such as the work entitled "Ingenious Mechanisms for Designers and Inventors," edited by Franklin D. Jones, published in 1951 by the Industrial Press of New York.

While particular embodiments of this invention have been shown and described, it will, of course, be apparent that various modifications may be made without departing from the invention. Therefore, by the appended claims, it is intended to cover all such changes and modifications as fall within the true spirit and scope of the present invention.

What we claim as new and desire to secure by Letters Patent of the United States is:

1. In a system for assembling leaded electrical components into circuit matrices, the combination comprising a plurality of component carriers, each having a transfer portion for handling said carrier and a lead gripping portion adapted to support a single electrical component by the leads thereof, means for installing components into said carriers, a plurality of magazines each adapted to accommodate a plurality of component carriers, means for installing a predetermined number of like components into each of said magazines, a component placement machine adapted to place electrical components in any of a plurality of positions upon a circuit matrix having a placement foot fitted to engage said transfer portion, means for circulating said number of circuit matrices equal to said predetermined number through said placement machine, and means for transferring a magazine to said placement machine each time said circuit matrices complete a cycle.

2. In a system for assembling leaded electrical components into circuit matrices, the combination comprising a plurality of component carriers, each having a transfer portion for handling said carrier and a lead gripping portion adapted to support a single electrical component by the leads thereof, means for installing components into said carriers, a plurality of magazines each adapted to accommodate a plurality of component carriers, means for installing a predetermined number of like components into each of said magazines, a component placement machine adapted to place a batch of electrical components equal to said predetermined number in each of a plurality of successive positions upon a circuit matrix, said placement machine having a placement foot fitted to engage said transfer portion, means for circulating a number of circuit matrices equal to said predetermined number through said placement machine, and means for transferring a magazine to said placement machine each time said circuit matrices complete a cycle.

3. In a system for assembling leaded electrical components into circuit matrices, the combination comprising a plurality of component carriers, each having a transfer portion for handling said carrier and a lead gripping portion adapted to support a single electrical component by the leads thereof, means for installing components into said carriers, a component placement machine adapted to place a batch of electrical components in each of a plurality of successive positions upon a circuit matrix, said placement machine having a placement foot fitted to engage said transfer portion, a conveyor for circulating a number of circuit matrices equal in number to said batch through said placement machine, means for loading said placement machine with a like numbered batch of components each time said matrices complete a cycle, and a pair of storage conveyors at the entrance and exit of said conveyor for averaging the demand and supply requirements of said placement machine.

4. In a system for assembling leaded electrical components into circuit matrices, the combination comprising a plurality of component carriers, each having a transfer portion for handling said carrier and a lead gripping portion adapted to support a single electrical component by the leads thereof, means for installing components into said carriers, a component placement machine having a placement foot fitted to engage said transfer portion, said placement machine being adapted to place a batch of electrical components in each of a plurality of successive positions upon a circuit matrix, a conveyor adapted to circulate a like numbered batch of circuit matrices through said placement machine at each position thereof, and a conveyor adapted to supply like numbered batches of like components in carriers to said placement machine at each position thereof.

5. In a system for assembling a predetermined number of electrical components into each of a plurality of circuit matrices, the combination comprising a plurality of component carriers, each having a transfer portion for handling said carrier and a lead gripping portion adapted to support a single electrical component by the leads thereof, means for installing components into said carriers, a component placement machine having a placement foot fitted to engage said transfer portion and adapted to place a batch of electrical components in each of a predetermined number of successive positions upon a circuit matrix, a conveyor adapted to circulate a batch of circuit matrices equal in number to said first batch through said placement machine at each position thereof and adapted after each predetermined number of positions to exchange loaded matrices for unloaded ones, and a conveyor adapted to supply a succession of batches, equal in number to said first batch, of like components in component carriers to said placement machine at each position thereof and adapted after each predetermined number of positions to supply a second succession of batches of components similar to said first succession of batches of components.

6. In a system for assembling a predetermined number of electrical components into each of a plurality of circuit matrices, the combination comprising a plurality of component carriers, each having a transfer portion for handling said carrier and a lead gripping portion adapted to support a single electrical component by the leads thereof, means for installing components into said carriers, a component placement machine having a placement member fitted to engage said transfer portion and adapted to place a batch of electrical components in each of a predetermined number of successive positions upon a circuit matrix, a conveyor adapted to circulate a batch of circuit matrices, equal in number to said first batch, through said placement machine at each position thereof and adapted after each predetermined number of positions to exchange loaded matrices for unloaded ones, a conveyor adapted to supply a succession of batches, equal in number to said first batch, of like components in component carriers to said placement machine at each position thereof and adapted after each predetermined number of positions to supply a second similar succession of batches of components, and a pair of storage conveyors at the entrance and exit of said conveyor for averaging the demand and supply requirements of said placement machine.

7. In a system for assembling leaded electrical components into circuit matrices, the combination comprising a plurality of component carriers, each having a transfer portion for handling said carrier and a lead gripping portion adapted to support a single electrical component by the leads thereof, means for installing components into said carriers, a plurality of magazines, each adapted to accommodate a predetermined number of component carriers, means for installing said predetermined number of like components in carriers in each of said magazines, a component placement machine adapted to place said predetermined number of electrical components in each of a plurality of successive positions upon a circuit matrix, said placement machine having a placement member fitted to engage said transfer portion, a conveyor for circulating a number of circuit matrices equal in said predetermined number through said placement machine at each position thereof, and a conveyor adapted to supply a magazine loaded with components in carriers to said placement machine at each position thereof.

8. In combination, a plurality of part carriers, first means characterized by a closed motion loop extending past a carrier loading station, a part loading station, a test station, a magazine loading station and a reject station, means for placing part carriers on said first means at said carrier loading station, means inserting parts in part carriers borne by said first means at said part loading station, testing apparatus connected with parts in part carriers borne by said first means at said testing station, means adapted to insert filled part carriers in a cooperating magazine at said magazine loading station under the control of said test apparatus, and means responsive to said test apparatus for removing filled part carriers from said first means at said reject station.

9. A system for assembling leaded electrical components into circuit matrices through the intermediary of component carriers, each of which has a transfer portion, a lead gripping portion, and means for operating the lead gripping portion, said system comprising means for first installing the components into carriers with the leads securely positioned therein, and a component placement machine for inserting the leads of the component into a circuit matrix properly positioned with respect to said machine, said placement machine having means for engaging said carrier by the transfer portion thereof during said placement operation and means engaging the lead gripping operating means for releasing the leads of said component from said carrier after said leads have been inserted into said circuit matrix.

References Cited in the file of this patent

UNITED STATES PATENTS

| | | |
|---|---|---|
| 2,281,478 | Chirelstein | Apr. 28, 1942 |
| 2,536,677 | Brunner | Jan. 2, 1951 |
| 2,559,369 | Phillips | July 3, 1951 |
| 2,637,798 | Burge | May 5, 1953 |
| 2,714,761 | Wampole | Aug. 9, 1955 |

FOREIGN PATENTS

| | | |
|---|---|---|
| 589,275 | Great Britain | June 16, 1947 |